United States Patent Office 3,427,314
Patented Feb. 11, 1969

3,427,314
**METHODS OF PRODUCING TRICHLORO-
CYANURIC ACID**
Marc J. Sims, Columbia, and William F. Symes, Webster
Groves, Mo., assignors to Monsanto Company, St.
Louis, Mo., a corporation of Delaware
No Drawing. Filed Sept. 19, 1966, Ser. No. 580,210
U.S. Cl. 260—248                                    4 Claims
Int. Cl. C07d 55/40; B01j 2/00

ABSTRACT OF THE DISCLOSURE

Trichlorocyanuric acid, a substantial portion of which is of particle size sufficiently small to pass through a No. 200 mesh U.S. Standard screen, is agglomerated by heating to a temperature range of from 130–225° C. and agitating the particles. The agglomerated material reduces hazards and handling problems associated with dusting and is more conveniently utilized in bleaching, sterilizing, oxidizing and disinfecting operations.

---

The present invention relates to chlorocyanuric acids (including chloroisocyanuric acids) particularly trichlorocyanuric acid and has particular reference to improved processes of preparing trichlorocyanuric acid.

It has been proposed heretofore in U.S. Patent 2,607,-738 and U.S. Reissue Patent 24,412, issued to Edgar E. Hardy on Aug. 19, 1952, and on Dec. 31, 1957, respectively, to prepare trichlorocyanuric acid by dissolving cyanuric acid in the theoretical quantity of a 5% solution of caustic soda or potash and treating the resulting solution with chlorine until three atoms of alkali have been substituted by chlorine. However, Chattaway and Wardmore, in the "Journal of the Chemical Society," volume 81, pages 200–202, point out that, where relatively large quantities of reactants are used in the chlorination of cyanuric acid dissolved in the theoretical quantity of potash, low product yields and products low in available or active chlorine are obtained. Thus, the foregoing batch process is not adaptable to large scale commercial production.

It has also been proposed heretofore in U.S. Patent 2,964,525, issued Dec. 13, 1960, to William L. Robinson to prepare trichlorocyanuric acid by continuously chlorinating an aqueous solution of trisodium cyanurate at a pH of not more than 4.5 and at temperatures below 50° C. (The trisodium cyanurate is prepared by the reaction of substantially 3 mols of sodium hydroxide and 1 mol of cyanuric acid.) Trichlorocyanuric acid can generally be obtained in pure form and in high yields from the processes of the Robinson patent.

It has further been proposed heretofore in U.S. Patent 3,178,429, issued Aug. 13, 1965, to Steve Vazopolos to prepare trichlorocyanuric acid by continuously chlorinating an aqueous dispersion of tricalcium dicyanurate at temperatures below 50° C. until the pH of the dispersion or resulting reaction mixture is below 4.0. (The tricalcium dicyanurate is prepared by reacting, for example, calcium hydroxide with cyanuric acid in a molar ratio of 3:2.)

In conjunction with the aforementioned prior art, particularly U.S. Patents 2,964,525 and 3,178,429, the trichlorocyanuric acid produced by the processes disclosed therein is stated to be dried at a temperature less than 110° C.; note U.S. 2,964,525, column 4, lines 45–49, wherein the drying temperature is 105° C. and U.S. 3,178,429, column 6, lines 58–60, wherein the drying temperature is from 50° C. to 110° C. The inherent result of practicing the processes of the above-mentioned patents, i.e. U.S. 2,964,525 and U.S. 3,178,429, including the drying step, results in a trichlorocyanuric acid product which is characterized by being a finely divided crystalline material in which the size of the crystalline particles are such that a large portion, e.g. 40% to 80% of said particles will usually pass through a No. 200 mesh U.S. Standard screen. (However, under certain circumstances, it is desirable to have a particle size such that less than 20% of all the particles will pass through a No. 200 mesh screen.)

Although the trichlorocyanuric acid, produced by these prior art processes, may be employed in bleaching, sterilizing, oxidizing, and disinfecting operations, this material possesses certain disadvantages in handling and processing since many of the particles are so fine that they behave as dusts. Thus, during the processing and use of these materials, special equipment must be employed to overcome or eliminate the hazards inherent in dust formulation such as the danger of explosion and health hazards to personnel handling the trichlorocyanuric acid as fine particles or dusts. Such health hazards could result from the inhalation or breathing of the "dust" of the finely divided material unless appropriate measures such as special ventilating systems or protective respiratory equipment is used. Furthermore, such finely divided material or dust tends to lose a certain amount of its original available chlorine content when stored for prolonged periods of time or when incorporated in bleaching, sterilizing, or disinfecting compositions which are stored for prolonged time periods. Another disadvantage with the dusty or extremely fine prior art material is that it is characterized by having a high density which renders the material less suitable for use in the present day low density detergent formulations. Specifically, such material will stratify or form layers of different ingredients in the packaged product with the result that the formulation is not uniform in composition in all portions of the container or package. Although larger particles of chlorocyanuric acids can be prepared by mechanical means, such procedures are expensive and do not avoid some of the difficulties referred to above.

Thus, it can readily be seen that it is highly desirable from a technical and commercial viewpoint to provide a process for the preparation of a trichlorocyanuric acid which is characterized by having a larger particle size distribution than has heretofore been attainable, i.e. a particle size such that less than 20% by weight of the particles pass through a No. 200 mesh U.S. Standard screen.

Accordingly, it is an object of the present invention to provide a novel process which overcomes the aforementioned disadvantages in the prior art processes and results in the production of trichlorocyanuric acid particles which are characterized by having comparatively large crystals.

It is another object of the present invention to provide a process for preparing trichlorocyanuric acid which process substantially reduces or eliminates the disadvantages or potential disadvantages of the prior art methods discussed above.

It is a further object of the present invention to provide an improved process for producing trichlorocyanuric acid which is characterized by a particle size distribution such that less than 20% by weight of the particles pass through a No. 200 mesh U.S. Standard screen, and which contains a small percentage or minimum of dust or fines.

Other objects and advantages of the present invention will become apparent from the following description and the appended claims.

In general, the present invention provides a process for agglomerating trichlorocyanuric acid particles, which comprises heating the particles which have a particle size distribution such that greater than about 25% of said particles pass through a No. 200 mesh U.S. Standard screen, while continuously agitating the particles (or while maintaining said particles in a state of constant motion), at a temperature of from about 130° C. to about 225° C. for a period of time sufficient to cause agglomeration of the particles.

Generally, the present invention is based on the discovery that trichlorocyanuric acid when heated to from 130° C. to 225° C. and agitated, agglomerates with a resultant increase in size of the particles so that 80% by weight or more of the particles are retained on a 200 mesh U.S. Standard screen. Stated differently, it is possible by the process of the present invention to obtain a substantial reduction in the weight percent of particles passing through a No. 200 mesh U.S. Standard screen.

The trichlorocyanuric acid particles used as the starting material for the above-described novel process may be either in the anhydrous form or water-wet form (i.e. a water-containing form, for example, containing up to 15 to 25% by weight water). Furthermore, the trichlorocyanuric acid particles to be treated by the novel process of the present invention initially should have a particle size distribution such that at least about 25%, preferably from about 30% to 100%, by weight of the particles (in the dry state) pass through a No. 200 mesh U.S. Standard screen. Trichlorocyanuric acid having such particle size distribution can be made by the process described in the patents referred to below. Specifically, the following particle size distribution is characteristic of the trichlorocyanuric acid produced in the past by the prior art processes hereinafter referred to.

U.S. Standard screen (cumulative values):

| | Percent |
|---|---|
| On 100 mesh | 1–5 |
| On 140 mesh | 4–11 |
| On 170 mesh | 8–20 |
| On 200 mesh | 11–41 |
| Through 200 mesh | 59–89 |

The aforementioned prior art processes are those described in U.S. Patents 2,607,738; Reissue 24,412; 2,964,525; 2,969,360; and 3,178,429; all of which are incorporated herein by reference. It is to be noted that these patents are not all inclusive but merely for exemplary purposes only in order to illustrate processes which result in production of small crystalline size trichlorocyanuric acid having the aforementioned particle size distribution.

While the trichlorocyanuric acid particles described in the preceding paragraph may be prepared by a wide variety of procedures, the following embodiment is presented in order to exemplify the preparation of such particles and demonstrate the application of the novel process described herein to freshly prepared, small crystal size trichlorocyanuric acid.

Accordingly, one embodiment of the present invention relates to a process for preparing relatively large particle size trichlorocyanuric acid by first reacting an aqueous alkaline solution containing a metallic compound from the group alkali metal hydroxides and alkaline-earth metal hydroxides, oxides, and carbonates, with cyanuric acid to form a metal salt cyanurate (i.e. a metallic salt of cyanuric acid) solution or dispersion, after which the metal salt cyanurate solution or dispersion is then contacted with a sufficient quantity of chlorine in a reaction zone which is maintained at a temperature less than 50° C. to form, at a pH less than 4.5, trichlorocyanuric acid particles. Such particles have a particle size distribution such that more than about 25% by weight of said particles pass through a No. 200 mesh U.S. Standard screen. These particles which serve as the starting material of the present invention are separated from the aqueous phase of the resultant reaction mixture and dried, while continuously agitating said particles, at a particle temperature of about 130° C. or higher, but below the decomposition temperature of trichlorocyanuric acid, for a period of time sufficient to cause the trichlorocyanuric acid particles to agglomerate to form substantially larger particles.

The present discovery that trichlorocyanuric acid particles can be caused to agglomerate or increase in size by the process of the present invention was surprising since of the known polychlorocyanuric acids and metallic salts thereof, only trichlorocyanuric acid is agglomerated by the process. Of these salts only trichlorocyanuric acid is observed to undergo a crystalline phase transition when heated and it is believed, therefore, that agglomeration is associated with this phase transition.

As previously mentioned, the trichlorocyanuric acid particles can be treated according to the processes of the present invention if they contain about 25% by weight or less, preferably less than 15% by weight of water. In the preparation of trichlorocyanuric acid particles in an aqueous medium, the separation of the freshly precipitated particles from the bulk of the aqueous phase of the resultant reaction mixture of the cyanurate solution by means of centrifugation or filtration usually results in a product which contains less than 15% by weight water. However, greater amounts, for example 25%, of water can be present and said particles are still capable of being treated by the process of the present invention.

The aforementioned crystalline phase transition occurs at a particle temperature of about 130° C. and thus it is important to note that at temperatures less than 130° C., such transition does not take place and there is no agglomeration of the trichlorocyanuric acid particles as will be pointed out hereinafter with reference to the prior art processes of drying freshly precipitated trichlorocyanuric acid particles.

In order to bring about this crystalline phase transition in and agglomeration of the small size trichlorocyanuric acid particles, there are three critical factors which must be met. First and as previously mentioned, the particles must be heated and/or dried at a temperature not less than 130° C., preferably between 130° C. and 220° C., i.e. the particle temperature must be 130° C. or greater to induce agglomeration. It is to be noted that the temperatures referred to herein are the temperatures of the trichlorocyanuric acid particles per se. Thus, the actual temperature of the means or heat transfer medium (such as air or a heated surface) employed to bring the particle to a temperature, e.g of 130° C., is usually higher than the actual particle temperature. At particle temperatures above 220° C.–225° C., trichlorocyanuric acid decomposes without melting; however, no melting of the trichlorocyanuric acid particles has been observed during experimentation when said particles are maintained at a temperature between 130° C. and 220° C.

The second critical factor in the present process relates to the time period during which the trichlorocyanuric acid particles at a temperature of from about 130° C. to tures. Specifically, such particles must attain a temperature not less than 130° C. for a period of time sufficient to promote agglomeration. This period of time is usually from about 5 minutes to about 90 minutes at a temperature range of from about 130° C. to about 220° C. It is preferable to first heat and/or dry the trichlorocyanuric acid particles at a temperature of from about 130° C. to about 160° C. for a period of from about 5 minutes to about 30 minutes, more preferably from about 10 minutes to about 20 minutes, and then to conduct the heating and/or drying at a higher temperature, i.e. at a temperature at from about 160° C. to about 200° C. for at least 2 minutes, preferably for a period of from about 2 minutes to about 20 minutes, more preferably from about 5 minutes to about 15 minutes. It also has been found that when the trichlorocyanuric acid particles contain water, for example, less than 15% by weight, it is desirable to drive off a major portion of the water at a particle temperature less than 160° C., preferably from about 130° C. to about 160° C. and then with less than 1% water being present, to finish heating the particles at a particle temperature of from about 160° C. to about 200° C.

The third critical factor in bringing about the aforementioned particle agglomeration is the requirement that the trichlorocyanuric acid particles must be periodically and/or frequently agitated in order to prevent crusting, i.e. the fusing or clustering together of the particles at the top portion of the bed of layer of material being treated. This periodical agitation is preferably done on a basis of from about every 5 seconds to about every 15 seconds, the actual agitation time being sufficient to insure that any crust forming in the top layer of particles is broken up, preferably prevented from forming, and these top particles are dislocated or scattered from their crust-forming positions. The agitation time can be for any length of time but must be at least 5 seconds. It is preferred, however, that the particles be continuously agitated or maintained in a continuous state of motion during the heating and/or drying of said particles at the aforementioned temperatures and time periods. This periodic agitation or maintenance of a constant or continuous state of motion or agitation of the particles may be obtained by any suitable means, that is, any mechanical means which include means such as merely stirring the particles, to the utilization of a vibrating pan, vibrating horizontally extending drier and the like. It has presently been observed that when the trichlorocyanuric acid particles are heated to a temperature of 130° C. or higher in a completely static state, i.e. without any agitation whatsoever, the particles fuse together to form a crust on the top of the bed or layer of material, which crust is difficult to break up and consequently does not result in a free flowing product. Moreover, since such crust or layer must be comminuted, for example, in a Ball Mill, in order to obtain a material which will flow freely, such comminution results in the generation of dust or fines which are objectionable for reasons hereinbefore referred to. However, it was surprising to find that when the aforementioned periodic or continuous agitation is carried out, there are no fines or dust produced therefrom.

While some of the prior art processes previously referred to herein have disclosed that water-wet trichlorocyanuric acid particles may be dried, such art does not teach or suggest that the drying be carried out at a temperature such that the particles themselves are heated to a temperature of about 130° C. or higher, nor has this art recognized that such heating could cause the particles to agglomerate as in the processes of the present invention. The end result achieved by carrying out the steps of the novel process of the present invention is the production of trichlorocyanuric acid which is characterized by having a relatively large particle size such that less than 20% by weight of all the particles pass through a No. 200 mesh U.S. Standard screen. The large particle size trichlorocyanuric acid may be used directly as prepared then or it may be further processed, for example reacted with monopotassium dichlorocyanurate to produce [(mono-trichloro) tetra - (monopotassium dichloro)] penta-isocyanurate which process is described in detail in U.S. 3,150,132.

The trichlorocyanuric acid referred to herein, compounds derived therefrom, and mixtures thereof generally constitute an "available chlorine-containing" compound which has the utility of "active or available" chlorine-containing material in oxidizing, sterilizing, bleaching, and sanitizing formulations, such as, for example, household laundry compositions, bleaches, scouring powders, and sanitizing and dish-washing compositions. Such formulations (or uses) are described, for example, in detail in the Hardy patents U.S. 2,607,738 and U.S. Reissue 24,412; U.S. 3,154,545; and U.S. 3,150,132.

As a specific and preferred embodiment of the present invention there is provided a process for agglomerating water-wet trichlorocyanuric acid particles which contain less than 25% by weight water and which have a particle size distribution such that greater than about 25% of said particles pass through a No. 200 mesh U.S. Standard screen, which comprises heating said particles at a particle temperature of from about 130° C. to about 160° C. for a period of from about 5 minutes to about 30 minutes and then subsequently increasing and maintaining thereafter the particle temperature at from about 160° C. to about 200° C. for a period of from about 2 minutes to about 20 minutes whereby the heating causes the particles to agglomerate to form larger particles which have a particle size distribution such that less than 20% by weight of all the particles pass through a No. 200 mesh U.S. Standard screen. This heating is conducted under conditions such that the trichlorocyanuric acid particles are periodically agitated or are continuously maintained in a fluidized bed state.

The following illustrates the application of the novel process of the present invention to the preparation of trichlorocyanuric acid of the desired particle size starting with cyanuric acid. In this process, an aqueous alkaline solution containing, for example, from about 10% to about 50% by weight of a metallic compound from the group alkali metal hydroxides and alkaline-earth metal hydroxides, oxides, and carbonates, is reacted with cyanuric acid to form an alkali metal or alkaline-earth metal cyanurate solution containing, for example, from about 10% to about 50% by weight of the cyanurate therein. Such metal salt cyanurate solution is then contacted with a sufficient quantity of chlorine (which chlorine is dispersed therein, for example, by mechanical means such as a mechanical agitator) in a reaction zone which is maintained at a temperature less than 50° C. (generally about 0° C. to about 50° C., preferably from about 10° C. to about 35° C.) to form, at a pH less than 4.5 small size trichlorocyanuric acid particles which have a particle size distribution such that at least about 25% by weight of said particles pass through a No. 200 mesh U.S. Standard screen. These particles are separated from the aqueous reaction medium (which is preferably removed from the reaction zone at a rate sufficient to maintain the volume therein constant when the operation is carried out on a continuous basis) until they contain 15% by weight or less of the water. The separate particles are subsequently heated, while periodically or continuously agitating said particles, at a particle temperature of from about 130° C. to about 225° C. for a period of from about 5 to about 90 minutes whereby there is promoted a crystalline phase change in said particles, which is believed to be the mechanism causing the trichlorocyanuric particles to agglomerate to form substantially larger size particles.

In the embodiment set forth in the preceding paragraph, the metallic compound may be, for example, sodium hydroxide or calcium hydroxide, which when reacted with cyanuric acid in a molar ratio of 3:1 and 3:2, respectively, forms trisodium cyanurate or tricalcium dicyanurate. When the trisodium cyanurate is contacted with chlorine, it is desirable that the resulting solution have a pH between 2.5 and 4.3; when the tricalcium dicyanurate is used, it is desired to have the pH below 4.0, for example, 2.5 to 3.5.

The amount of chlorine utilized in the process set forth immediately above is at least equal to the stoichiometric amount necessary to replace the sodium or calcium atoms in the molecular structure of the cyanurate and dicyanurate, respectively. Additional chlorine, for example, 20% to 100% in excess of that required, can be utilized if one so desires.

While the present invention processes heretofore set forth have been generally directed to a batchwise process, it should be noted that these novel processes of the present invention may also be carried out on a continuous basis. For exemplary purposes and if one desired to prepare trichlorocyanuric acid from tricalcium dicyanurate, the dicyanurate solution, which is prepared, e.g., in the manner heretofore set forth, is continuously fed into a reaction zone or vessel which contains a heel, i.e., an aqueous solution containing a quantity of trichlorocyanuric acid. Concurrently with the feeding of said dicyanurate, chlorine (either gaseous or liquid solution) is also fed into said heel whereby the reaction between the two ingredients being fed produces freshly precipitated trichlorocyanuric acid particles. The said acid particles will generally gravitate toward the bottom of the reaction zone and then these particles which are contained in an aqueous phase can be continuously removed therefrom, for example, by a screw conveyer, as new acid particles are formed and thus no particle buildup occurs. The accumulated liquid, i.e. the water from the dicyanurate solution, may be removed by simply allowing it to overflow the reaction vessel, i.e. decantation, into troughs or similar other conveying type equipment.

Since the operating step of decantation is used in the above continuous process, it is desirable to continuously feed the aforementioned reactants to the reaction zone or vessel at a point somewhat below the top level of a liquid in said vessel and also provide continuous agitation in this feed zone whereby the desired pH is maintained and the materials undergo immediate reaction.

When the aforementioned freshly formed acid particles are continuously removed from the said vessel, they are separated from the aqueous phase associated therewith by any mechanical means, such as a vacuum rotary drum type filter. After being removed from this filter, then said particles can be continuously fed to, for example, a horizontally extending type vibrating drier which provides the means wherein said acid particles undergo the novel phase transition which thus promotes agglomeration thereof and causes the small acid particles to become substantially larger particles.

A further understanding of the processes of the present invention will be obtained from the following examples which are intended to illustrate the invention but not to limit the scope thereof, parts and percentages being by weight unless otherwise specified.

Example I

Six 50-gram samples of trichlorocyanuric acid (sold commercially by Monsanto Company under the trademark ACL-85) containing less than .5% by weight water and characterized in that at least 61.5% by weight of the particles in each sample pass through a No. 200 mesh U.S. Standard screen were separately placed in a 12″ x 9½″ x 1″ Hastelloy "C" pan which was attached to a Cenco Meinzer sieve shaker. The underside of said pan was heated by a steam coil which was held against the pan by Therman, which is a trademark for a commercially available insulating compound. Before adding the samples to the pan, the pan was preheated to temperatures sufficiently high so that the particles of trichlorocyanuric acid would be heated to and maintained at the temperature listed in Table I. The trichlorocyanuric acid particles of each sample when it was placed in the pan spread out into a layer about 6 inches in diameter and ¼ inch thick at the center. The particles were maintained in constant motion in the pan, during the entire period of heating, by a shaker mechanism which produced a circular movement of the pan.

The individual samples were removed from the pan after a 12-minute heating period (for each sample) at the respective particle temperatures listed in Table I and analyzed for percent passing through a No. 200 mesh U.S. Standard screen and bulk density. The results of these analyses are set forth in Table I.

As can readily be seen from the results in Table I, the heating of the particles while continuously agitated or while in constant motion produced an agglomeration of the particles to such an extent as to significantly reduce the percentage by weight of particles passing through a No. 200 mesh U.S. Standard screen. Furthermore, it will be noted that the bulk density of the agglomerated particles was substantially reduced which result is highly desirable since certain type detergent formulations, e.g. dishwashing compositions, require raw materials having a bulk density of 0.60 gm./cc. or less in order to prevent the formation of strata or layers of nonuniform composition in such formulations.

TABLE I

| Temperature, ° C. (Trichlorocy-anuric Acid Particle) | Heating Period, Minutes | Particle Size Distribution (Through a No. 200 Mesh U.S. Standard Screen) | | Bulk Density, gm./cc. | |
|---|---|---|---|---|---|
| | | Before Heating | After Heating | Before Heating | After Heating |
| 130 | 12 | 61.5 | 19 | 0.970 | 0.601 |
| 140 | 12 | 61.5 | 18 | 0.970 | 0.597 |
| 150 | 12 | 61.5 | 18 | 0.970 | 0.596 |
| 160 | 12 | 61.5 | 14 | 0.970 | 0.575 |
| 170 | 12 | 61.5 | 16 | 0.970 | 0.578 |
| 210 | 12 | 61.5 | 18 | 0.970 | 0.599 |

The above mentioned samples were observed under the microscope prior to and after the agglomeration thereof. This examination disclosed that the trichlorocyanuric acid particles, before being heated, were transparent crystals which were blocky in shape; whereas the heated and agglomerated particles were opaque crystals which were rodlike in shape.

In order to determine the stability of the afore-mentioned agglomerated particles and as contrasted to non-agglomerated particles, a 100 mg. sample of the (unheated) trichlorocyanuric acid material initially used herein, and 100 mgs. each of the above described heated samples were separately mixed into individual 10 gram samples of a detergent formulation containing 96% by weight Silex (highly ground $SiO_2$ material) and 4% by weight Santomerse® 85 which is a sodium alkyl benzene sulfonate type detergent active in which the alkyl group contains from 10–15 carbon atoms. The resultant mixtures were then placed in open vials and stored for 30 days at room temperature and humidity (about 25° C. and 75% relative humidity). At the end of this 30-day period, each of the resultant mixtures was analyzed for loss of available chlorine. While all of the samples analyzed showed a loss of available chlorine of about 35–38%, there was no significant difference in available chlorine loss between the formulation containing the non-agglomerated trichlorocyanuric acid, i.e. the material dried by the prior art processes (e.g. U.S. 2,964,525 and 3,178,429), and the formulations containing the agglomerated trichlorocyanuric acid. Thus, it is apparent that the novel agglomeration process of the present invention results in the same type stability as contrasted to that stability achieved by the prior art processed trichlorocyanuric acid, notwithstanding the crystalline phase transition at elevated temperatures in the present novel process.

The procedure of Example I, set forth above, was repeated using a 50-gram sample of dichlorocyanuric acid (sold commercially by Monsanto Company under the trademark ACL 70). This sample was heated while being continuously agitated for approximately 12 minutes at a temperature of approximately 160° C. Analysis of the material before and after heating showed that each sample had a similar particle size distribution, i.e. both samples analyzed to have approximately 48% by weight of the particles passing through a No. 200 mesh U.S. Standard screen. Microscopic examination of the material before and after heating disclosed that there was no apparent change in crystalline structure and consequently there was thus no agglomeration as evidenced by the similar type particle size distribution of both samples. As previously mentioned, the crystalline phase transition of the trichlorocyanuric acid and the consequential agglomeration of particles thereof is peculiar to said acid and has not been found true in the other polychlorocyanuric acids, for example the above mentioned dichlorocyanuric acid.

Example II

Approximately 50 grams of trichlorocyanuric acid containing about 15% by weight water were prepared by the procedure of Example III, column 4, lines 60–75, and column 5, lines 1–60, of the Robinson patent U.S. 2,964,525. This 50-gram sample was further characterized in that at least 74% by weight of the particles passed through a No. 200 mesh U.S. Standard screen. Utilizing the same equipment and apparatus as set forth and described in Example I (present invention), the pan of the Cenco-Meinzer sieve shaker was preheated to a sufficiently high temperature in order that the particles of the trichlorocyanuric acid would be heated to and maintained at a temperature of approximately 140° C. for the first 10 minutes of heating. The 50-gram sample of said acid was spread out into a thin layer, i.e. 1/8″–1/4″ at center, in the pan, then heated therein at 140° C. for approximately 10 minutes and then the pan was heated further to provide a temperature of the trichlorocyanuric acid particles of about 180° C. These acid particles were then heated at 180° C. for approximately 4 minutes.

A small sample of the trichlorocyanuric acid heated at 140° C. was obtained prior to heating said acid at 180° C. and the water content analyzed to be approximately 0.9%.

This 50-gram sample was removed from the pan after a total heating time of approximately 14 minutes and screened to ascertain the weight percent of product passing through a No. 200 mesh U.S. Standard screen. The bulk density was also determined. The analysis of the sample disclosed that only 18% by weight of all the particles pass through the No. 200 mesh screen; this is contrasted with the 74% which passed through the 200 mesh screen prior to the above heating step. The bulk density of the acid sample before and after heating was, respectively, 0.951 and 0.545 gram per cc.

The procedure set forth in the above Example I regarding the stability during storage of the agglomerated trichlorocyanuric acid particles incorporated in a detergent formulation was again repeated utilizing the agglomerated trichlorocyanuric acid particles of Example II. The results of the storage test disclosed that the loss of available chlorine was approximately 36% over a period of 30 days at a room temperature and humidity, respectively, of about 25° C. and 75% relative humidity. This loss of available chlorine is similar to the loss of available chlorine obtained from the stability test conducted in the above Example I and is also equivalent to the results obtained for the stability of the nonagglomerated trichlorocyanuric acid particles of the prior art stored under the same conditions heretofore set forth.

The procedure set forth in the Example II above was repeated with the only exception that instead of the pan being continuously rotated in a circular motion to provide a continuous agitation, the pan was rotated at 5-second intervals for an agitation period of approximately 5 seconds in order to provide a periodic agitation to the trichlorocyanuric acid particles contained therein. The results obtained from the analysis of this sample showed that there was no significant difference from those results obtained from the above-described Examples I and II.

What is claimed is:

1. A process for agglomerating trichlorocyanuric acid particles which have a particle size distribution such that greater than about 25% of said particles pass through a No. 200 mesh U.S. Standard screen, which comprises heating the particles at a temperature of from about 130° C. to about 225° C., while at least periodically agitating the particles, for a period of time sufficient to cause the trichlorocyanuric acid particles to agglomerate to form larger particles.

2. The process as set forth in claim 1 wherein the agglomerated trichlorocyanuric acid particles are of such size that less than 20% by weight of all the particles pass through a No. 200 mesh U.S. Standard screen.

3. The process as set forth in claim 1 wherein the time period is from about 5 minutes to about 90 minutes.

4. A process for agglomerating trichlorocyanuric acid particles which contain less than about 25% by weight water and which have a particle size distribution such that greater than 25% of said particles pass through a No. 200 mesh U.S. Standard screen, which comprises heating said particles at a particle temperature of from about 130° C. to about 160° C. for a period of from about 5 minutes to about 30 minutes and subsequently increasing and maintaining the particle temperature at from about 160° C. to about 200° C. for a period of from about 2 minutes to about 20 minutes whereby the heating causes the particles to agglomerate to form larger particles which have a particle size distribution such that less than 20% by weight of all the particles pass through a No. 200 mesh U.S. Standard screen, said heating being conducted while the trichlorocyanuric acid particles are continuously maintained in a fluidized bed state.

References Cited

UNITED STATES PATENTS

| | | | |
|---|---|---|---|
| 3,043,652 | 7/1962 | Schytil | 264—117 |
| 3,178,429 | 4/1965 | Vazopolos | 260—248 |
| 3,184,458 | 5/1965 | Frazier | 260—248 |
| 3,299,132 | 1/1967 | Dougherty | 264—117 |
| 3,306,958 | 2/1967 | Gidlow | 264—117 |

OTHER REFERENCES

Ludwig: Chemical Engineering, pp. 156–9, January 1954.

HENRY R. JILES, *Primary Examiner.*

JOHN M. FORD, *Assistant Examiner.*

U.S. Cl. X.R.

264—126

PO-1050
(5/69)

UNITED STATES PATENT OFFICE
CERTIFICATE OF CORRECTION

Patent No. 3,427,314      Dated February 11, 1969

Inventor(s) Marc J. Sims & William F. Symes

It is certified that error appears in the above-identified patent and that said Letters Patent are hereby corrected as shown below:

Column 4, line 58, cancel beginning with "at a temperature" to and including " to tures." on line 59, and insert the following:

-- are heated at the above mentioned temperatures. --

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents